United States Patent [19]

Smith

[11] Patent Number: 4,874,057
[45] Date of Patent: Oct. 17, 1989

[54] HYDROMECHANICAL ALL WHEEL DRIVE

[76] Inventor: Roger M. Smith, 7261 Lyons, Imlay City, Mich. 48444

[21] Appl. No.: 174,926

[22] Filed: Mar. 29, 1988

[51] Int. Cl.⁴ .......................................... B60K 17/356
[52] U.S. Cl. .................................... 180/242; 180/308
[58] Field of Search ................. 180/233, 242, 245, 76, 180/308, 305, 243, 9.48

[56] References Cited

U.S. PATENT DOCUMENTS 3,355,886 12/1967 Weisenbach ........................ 180/308
4,116,294 9/1978 Johnston ............................. 180/242

FOREIGN PATENT DOCUMENTS 0137406 4/1985 European Pat. Off. ............ 180/6.48
1132450 6/1962 Fed. Rep. of Germany ...... 180/308

Primary Examiner—Charles A. Marmor
Assistant Examiner—Karin Tyson
Attorney, Agent, or Firm—Peter A. Taucher; Damian Porcari

[57] ABSTRACT

A hydromechanical all wheel drive mechanism providing both hydraulic and mechanical drive to each wheel. A valve in the hydraulic drive senses the relative wheel slippage on one side of the vehicle and compensates for that slippage by directing greater hydraulic power to the side of the vehicle which has greater traction.

5 Claims, 4 Drawing Sheets

HYDROMECHANICAL ALL WHEEL DRIVE

GOVERNMENT INTEREST

The invention described herein may be manufactured, used, and licensed by or for the Government for governmental purposes without payment to me or any royalty thereon.

BACKGROUND OF THE INVENTION

This invention relates to a combined hydraulic-mechanical drive for wheeled vehicles. The invention utilizes a novel valve system that senses when a wheel loses traction. It then diverts hydraulic power to other wheels. The invention eliminates the need for a differential.

Prior art devices exist that combine hydraulic and mechanical drive to a vehicle axle, however, these devices have been primarily directed to tracked vehicles. Wheeled vehicles having mechanical all wheel drive utilize a differential for each axle. These differentials are heavy and costly. The space requirements necessary to maintain sufficient ground clearance increase the vehicle's center of gravity. An axle having a differential requires a large space between the drive wheels to acommodate the differential housing. The vehicle's floor pan must be either raised above the differential, or a raised tunnel around the axle must protrude in the vehicle's floor. Differential's are not as efficient in transferring power to the wheels in all wheel drives.

SUMMARY AND OBJECTS OF THE INVENTION

It is the object of this invention to combine the mechanical and hydraulic drive in an in-hub planetary gear set. Differential action is provided by varying the amount of hydraulic drive to each wheel.

A further object of my invention is to distribute power to the wheels in proportion to the sum of the tractive capabilities of all the wheels on one side of the vehicle.

A further objects is to provide either mechanical or hydraulic drive to the wheels or a combination of both when desired.

A final object of my invention is to reduce the center of gravity of a mechanical all wheel drive vehicle by using an in-hub gear reduction with differential drive ability.

DETAIL DESCRIPTION OF THE DRAWINGS

Figure 1:
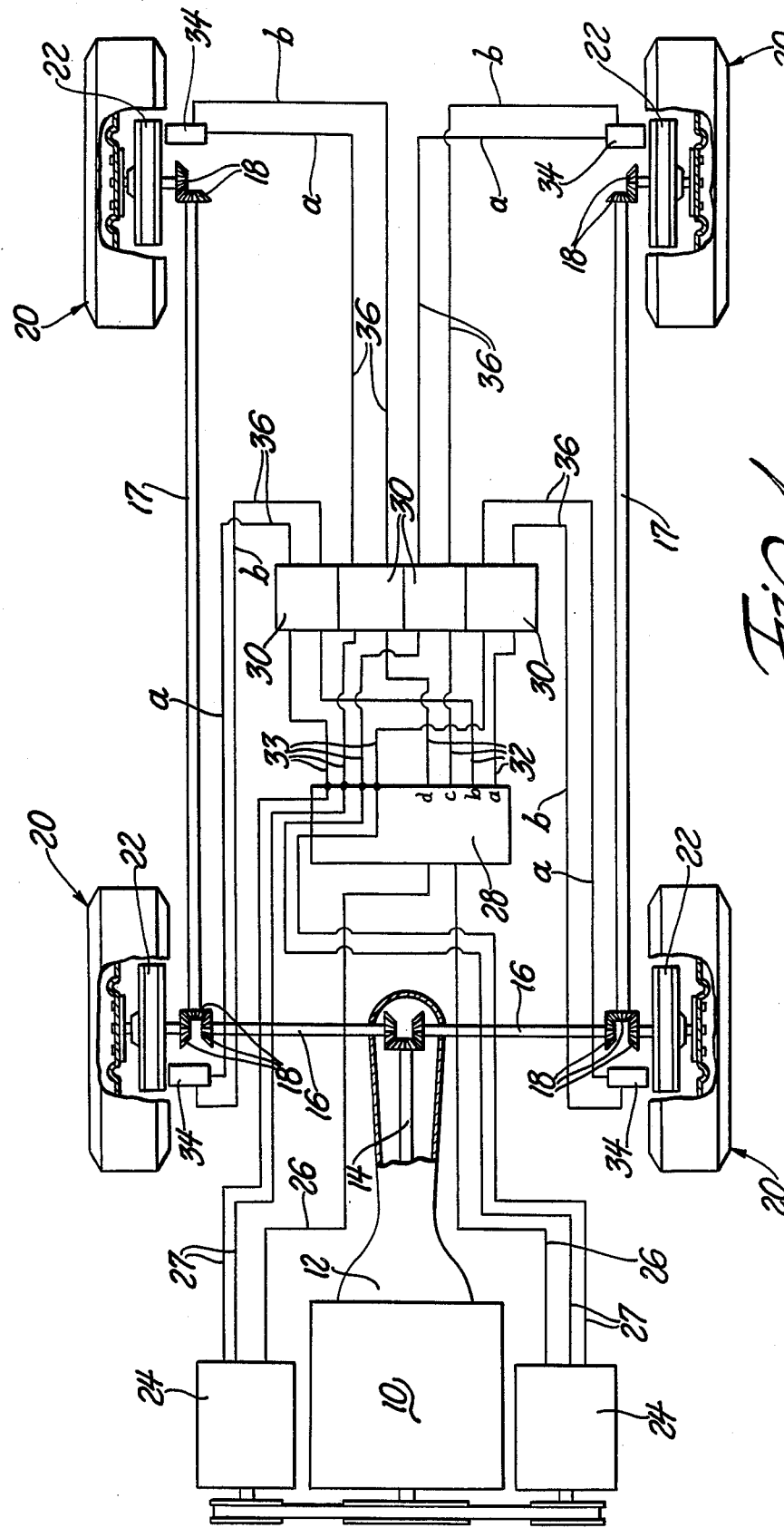
FIG. 1 is a schematic view of the invention adapted to a four wheeled vehicle.

FIG. 1 shows a schematic respresentation of the combined hydraulic and mechanical drive train. Mechanical drive is through a standard engine/transmission drive train. Engine 10 is a standard engine. It maybe either gasoline, diesel or turbine powered. A standard transmission 12 is used with engine 10. Output shaft 14 communicates power from the transmission to prop shafts 16. Right angle drives 18 drive prop shafts 17. Prop shafts 17 drive the wheel-hub assembly 20 through a planetary gear set 22.

The hydraulic drive is accomplished through a standard hydraulic pump/motor combination. Two standard hydraulic pumps 24 receive power from engine 10. One pump is contemplated for each drive axle. Each pump operates one drive axle. Pumps 24 should be as nearly identical as possible to give substantially equal output at a given engine RPM. The output of pumps 24 is fed to a distribution valve 28 through output lines 26. Distribution valve 28 (described in detail below) sums the fore and aft traction for each side of the vehicle, then directs greater hydraulic drive to the side with the combined greatest traction.

In addition to the gear selector found in transmission 12, the invention also comprises a hydraulic means for selecting forward and reverse direction. Valves 30 can be controlled by a four-position selector located in the cab (not shown). This hydraulic selector would have forward, reverse, lock and neutral positions. One three-way valve 30 is needed for each drive wheel. Each valve 30 has a feed and return line (32 & 33 respectively) from distribution valve 28 and two lines 36, communicating valves 30 with hydraulic pump/motor combination 34. Lines 36 alternate between feed and return based on the position of valve 30. When the hydraulic selector is in the forward position, valves 30 provide for a simple straight through flow path. In reverse, the feed and return paths are crossed. Neutral is accomplished by not communicating distribution valve 28 with pump/motors 34. Valve 30 redirects feed line 32 to return line 33. Valves 30 would be controlled from the hydraulic selector placed in the cab. A locking means would prevent the mechanical and hydraulic selectors from being placed in opposite directions. Input lines 27 return hydraulic fluid from return lines 33 to pumps 24.

Figure 2:
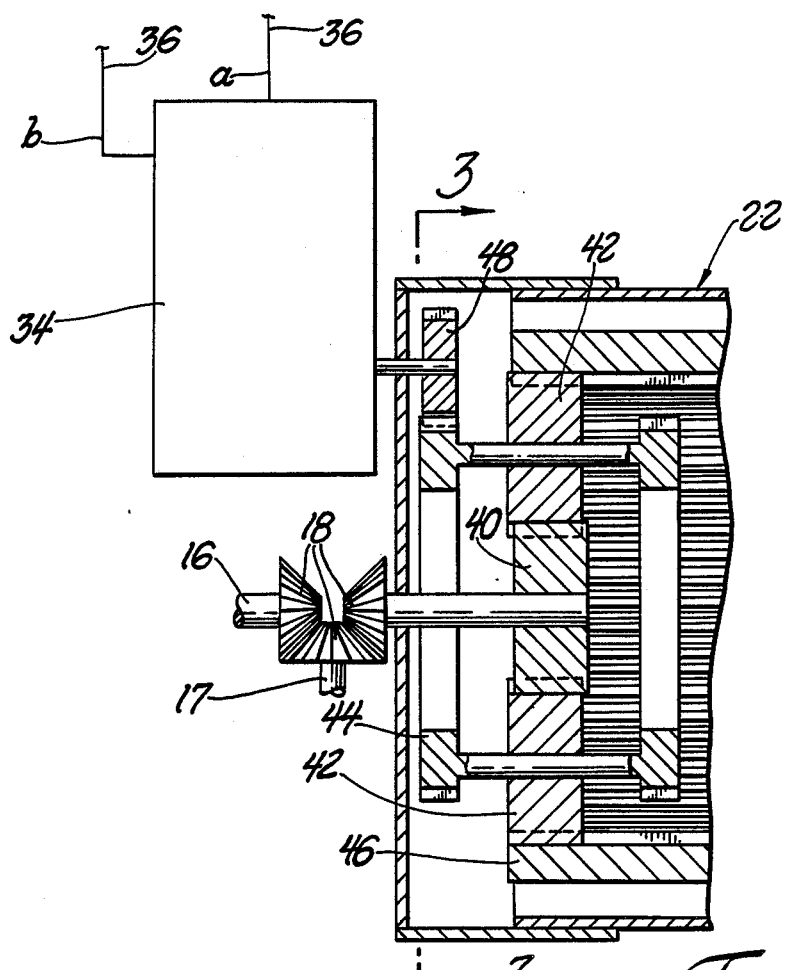
FIG. 2 is a detailed sectional view of the right front wheel-hub assembly showing the planetary gear set.
Figure 3:
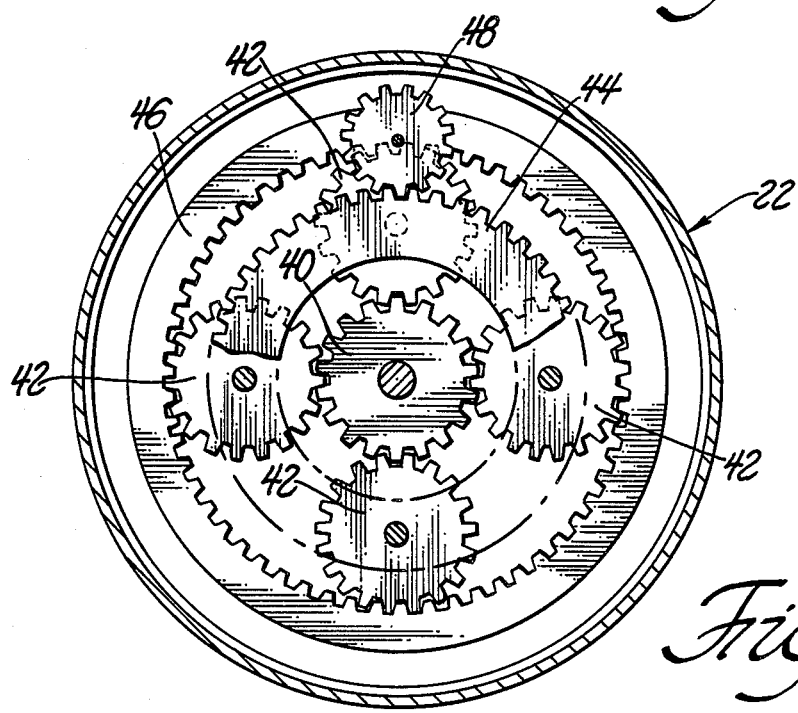
FIG. 3 is a sectional view of the wheel-hub assembly taken along the line 3—3 in FIG. 2.

Mechanical drive is supplied to the wheel-hub 20 through the planetary gear set 22 as shown in FIGS. 2 and 3. Prop shaft 16 drives sun gear through right angle drives 18. Sun gear 40 engages planetary gears 42. Planetary gears 42 are carried by a planetary gear carrier 44. Planetary gear carrier 44 has gear teeth on its outer circumference. Planetary gears 42 engage annulus 46. Annulus 46 is fixed to wheel-hub 20 (not shown). Gear 48 engages planetary gear carrier 44. Gear 48 is attached to the output of pump/motor 34 as shown in FIG. 2.

A detailed description of the method of operation is described later, however, pure mechanical drive is achieved by placing the hydraulic selector in lock position and the mechanical transmission gear selector in either drive or reverse. This causes gear 48 to lock. When there is no wheel slippage (i.e., all four wheels have equal or nearly equal traction) pump/motor 34 receives equal feed and return pressures through hydraulic lines a and b. Pump/motor 34 has equal feed and return pressure so that its output is locked. Gear carrier 44 is held fixed and mechanical drive through prop shaft 16 is transmitted directly through the planetary gears to the wheel-hub 20. When one side of the vehicle has less traction than the other side, the wheels having less traction begin to turn (slip) at a faster rate causing pump/motor 34 for this side to create a different pressure than the other side. Distribution valve 28 senses this difference in pressure and compensates by sending greater pressure to the wheels having greater traction and lesser pressure to the wheels undergoing slippage. To increase speed to the wheels having greater traction, greater hydraulic pressure is sent to pump/motor 34. Pump/motor 34 turns gear 48 clockwise and overdrives planetary gears 42. To reduce the speed of wheels undergoing wheel-slip, less hydraulic pressure is sent to pump/motor 34 turning gear 48 counterclockwise and allowing planetary gears 42 to partially race. When valves 30 of FIG. 1 are in neutral position, motors 34 receive no pressure. Gear 48 (FIG. 2) is allowed to spin freely. Mechanical drive to sun gear 40 causes planetary gear set 22 to race inside annulus 46. No motion is transferred to wheel-hub 20.

Pure hydraulic drive is achieved by placing transmission 12 in park position, locking the drive train including prop shafts 16 and 17. Sun gears 40 are held fixed by prop shafts 16 and 17. Forward motion is achieved by placing the hydraulic drive selector in the forward position. Valves 30 allow for a straight flow-through path of hydraulic pressure. Line a becomes the feed line and line b becomes the return line. Geare 48 (FIG. 2) turns counter clockwise propelling the vehicle forward. Reverse motion is achieved by placing the hydraulic selector in the "reverse" position causing valves 30 to cross the flow path of lines 36. Line b now becomes the feed line and line a becomes the return line. Motor 34 causes gear 48 to turn clockwise propelling the vehicle rearward.

DISTRIBUTION VALVE

Figure 4:
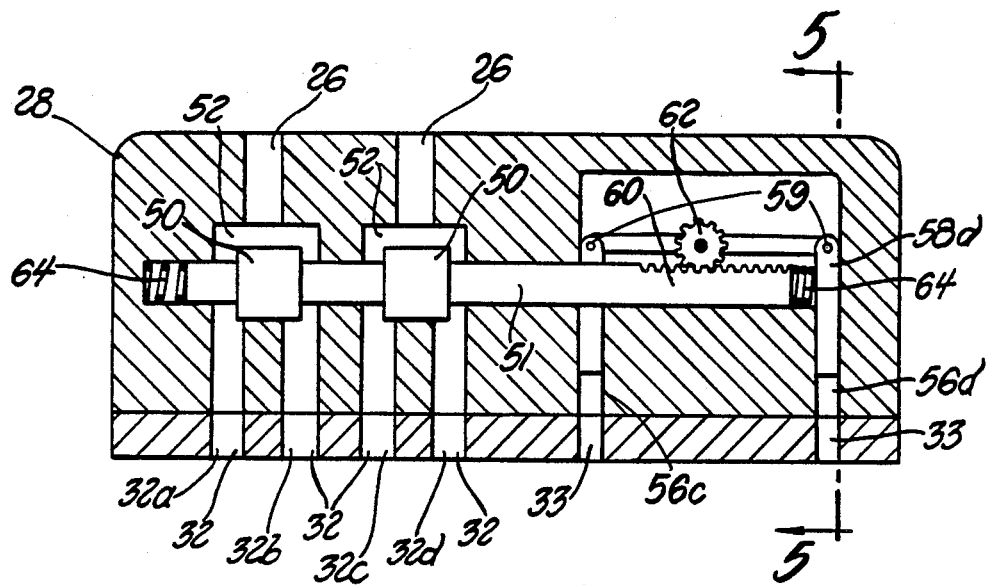
FIG. 4 is a sectional view of the distribution valve 28.

Distribution valve 28 (FIG. 4) acts to sum the relative wheel slippage on one side of a vehicle, and compensates for this wheel slippage by directing greater hydraulic pressure to the pump/motors 34 having greater traction. The valve acts to sum the traction occurring on each side of the vehicle and direct greater pressure (hence speed) to the side having the greater traction by sensing the increased hydraulic pressure in line 33 when one side is turning faster than the other. Valve 28 comprises four feed lines 32 to supply hydraulic pressure to each wheel. Valve 28 receives pressurized fluid from pump/motors 34 through input lines 26. Pistons 50 on plunger 51 move transversely within chamber 52. Pistons 50 partially block the flow of pressurized fluid in lines 32. Lines 32 communicate with ports 32a–d. Port 32a communicate with the left front wheel, port 32b with the right front wheel, port 32c with the left rear wheel, and port 32d with the right rear wheel. Rack teeth 60 on plunger 51 engage a pinion gear 62. Pinion gear 62 causes plunger 51 to move transversely.

Figure 5:
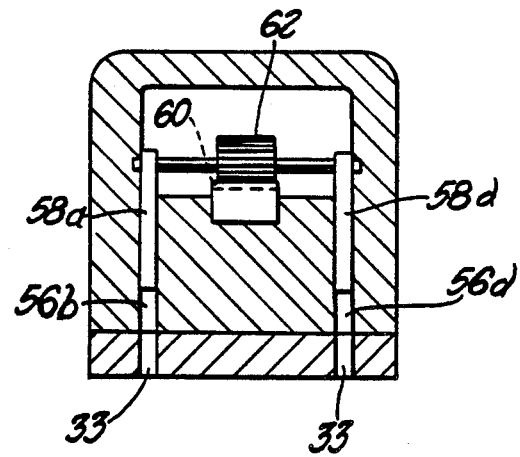
FIG. 5 is a sectional view of the distribution valve 28 taken along the line 5—5 in FIG. 4.

FIG. 5 shows an end view of distribution valve 28. Return lines 33 provide the return pressure of from pump/motors 34. Return lines 33 communicate with cylinders 56 Pistons 58 are connected with pinion gear 62. Cylinder 56a not shown communicates with the left front wheel, 56b with the right front wheel, 56c with the left rear wheel, 56d with the right rear wheel. Pistons 58a–d move linearly within cylinders 56a–d respectively. Braces 59 attach piston 58a with 58c and piston 58b with 58d. When there is no wheel slippage, pressure in lines 33 is approximately equal causing pistons 58 balance and pistons 50 to equally block the flow of pressurized fluid in lines 32.

Figure 6:
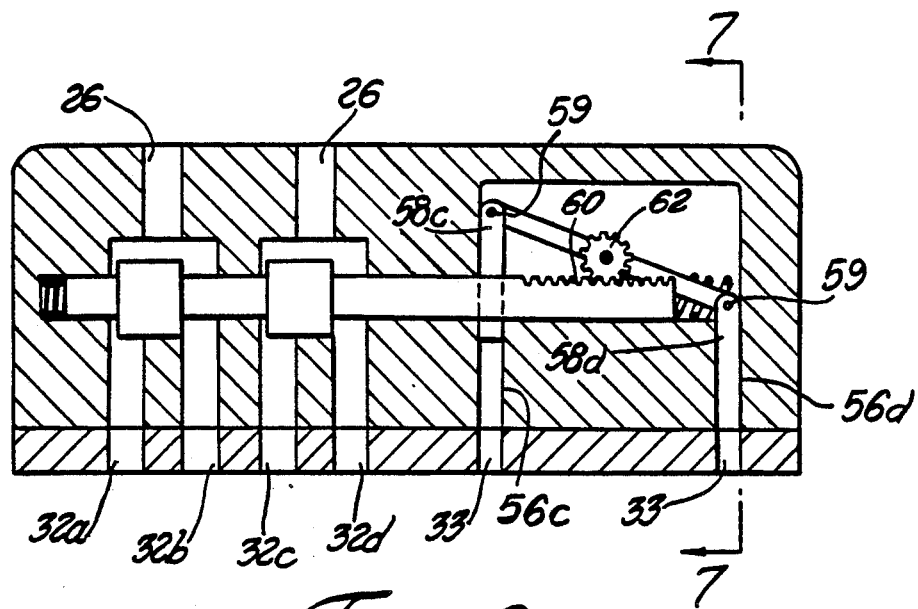
FIG. 6 is a sectional view of distribution valve 28 showing wheel slippage on the left side of the vehicle.
Figure 7:
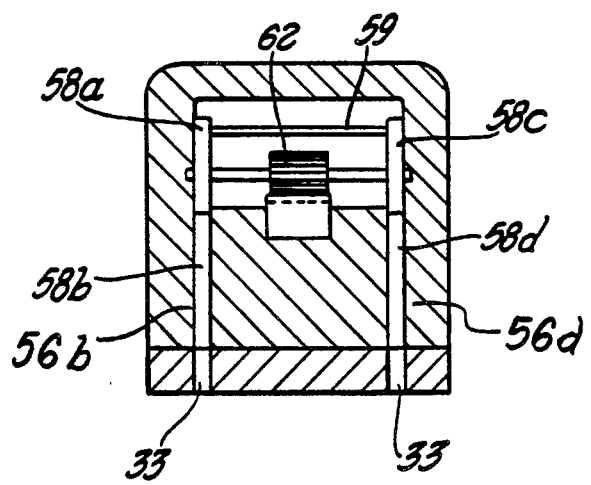
FIG. 7 is sectional view of FIG. 6 taken along the line 7—7.

Shown in FIG. 6 and 7, is the situation of the right wheels having greater traction than the left wheels. The left wheels begin to spin and consequently cause pump/motors 34 on the left side of the vehicle to generate greater pressure than the pump/motors on the right side. The greater pressure from the left wheels causes a greater pressure on pistons 58a and 58c than pistons 58b and 58d. Pistons 58a and 58c move up while pistons 58b and 58d to move down. Pinion gear 62 pushes plunger 51 to the left causing pistons 50 to block ports 32a and 32c. More hydraulic pressure is directed to ports 32b and 32d, than 32a and 32c causing the right wheels to turn faster than the left wheels. This situation continues until the wheels on the left side of the vehicle turn at approximately the same rate as the wheels on the right side. Pistons 58 act as the sum of the wheel slippage on one side of the vehicle. The invention as disclosed would not compensate for wheel slippage of a parallel set of wheels because the sum of the rotation speed for the wheels on each side of the vehicle would be equal. The invention could be modified to detect and compensate wheel slippage front to back rather than left to right.

A degree of differential action can also occur through distribution valve 28. When the vehicle turns, the outside wheels rotate at a slightly faster rate than the inside wheels. It is believed that this slight difference is not sufficient to bring pistons 58 out of balance. The amount of difference in wheel rotation required to bring the pistons 58 out of balance, and hence the amount of differential action can be controlled by the spring efforts of springs 64. The greater these efforts, the greater the differential action allowed by the distribution valve 28. The converse of increasing these spring efforts is that greater unwanted wheel slippage is permitted by distribution valve 28 before it compensates.

Although I have described and illustrated only one embodiment of my invention, it is understood that those skilled in the art may modify this configuration and arrangement of parts without necessarily departing from the spirit and scope of the invention.

I claim:

1. A wheel traction sensor for a vehicle wherein the vehicle has a right side and a left side, at least two wheels on each side, each wheel on the left side being parallel with and axially aligned with a corresponding wheel on the right side, the vehicle further having both mechanical and hydraulic drive inputs to each wheel, the hydraulic drive inputs including a hydraulic pump/motor attached to each wheel, the pump/motors having an output pressure corresponding to the rotational speed of the wheel; the sum of the output pressures on the right side corresponding to the sum of the rotational speeds of the wheels on the right side; the sum of the output pressures on the left side corresponding to the sum of the rotational speeds of the wheels on the left side; the wheel traction sensor comprising:

a left row of cylinders equal in number to the pairs of parallel wheels, each cylinder in the left row of cylinders communicating with the output pressure from a pump/motor on the left side;

a right row of cylinders equal in number to the pairs of parallel wheels, each cylinder in the right row of cylinders communicating with the output pressure from a pump/motor on the right side;

a piston disposed within each cylinder;

a first means for simultaneously moving the pistons in the right row of cylinders along equidistant parallel paths;

a second means for simultaneously moving the pistons in the left row of cylinders along equidistant parallel paths;

the output pressures from the wheels on the left side actuates the pistons in the left row of cylinders, and causes the first moving means to move a first distance corresponding to the sum of the rotational speeds of the wheels left side;

the output pressures from the wheels on the right side actuates the pistons in the right row of cylinders, and causes the second moving means to move a second distance corresponding to the sum of the rotational speeds of the wheels right side;

the difference between the first distance and the second distance corresponding to the difference in traction between the wheels on left side and right side of the vehicle.

2. A hydromechanical all wheel drive device for a vehicle wherein the vehicle has a right side and a left side, at least two wheels on each side, each wheel on the left side being parallel with and axially aligned with a corresponding wheel on the right side, the vehicle further having both mechanical and hydraulic drive inputs to each wheel through a planetary gear set, the hydraulic drive input is through an outer annulus in the planetary gear set and the mechanical drive input is through a sun gear in the planetary gear set; the hydraulic drive inputs including a hydraulic pump/motor attached to each wheel, the pump/motor having an input pressure and an output pressure; the output pressure corresponding to the rotational speed of the wheel; a first total of the rotational speeds of the wheels on the right side; a second total of the rotational speeds of the wheels on the left side; the wheel traction sensor comprising:

a first sensing means to determine a first sum of the output pressures from the pump/motors attached to the wheels on the right side, the first sensing means having a first sensor output corresponding to the first total; and a second sensing means to determine a second sum of the output pressures from the pump/motors attached to the wheels on the left side, the second sensing means having a second sensor output corresponding to the second total;

a valve means connected to the first and second sensor outputs, and to the input pressure to each pump/motor, the valve means measuring the difference between the first and second sensor outputs and increasing the input pressure to the pump/motors on the side of the vehicle having a lessor sensor output, and decreasing the input pressure to the pump/motors on the side of the vehicle having a greater sensor output.

3. The device in claim 2 wherein the first sensing means comprises:

a right row of cylinders equal in number to the wheels on the right side; each cylinder in the right row of cylinders communicating with the output pressure from a pump/motor on the right side; a piston disposed within each cylinder; a right rigid connector means attached between all of the pistons in the right row of cylinders, so that every piston in the right row of cylinders moves along equidistant parallel paths; the output pressure from the pump/motors on the right side actuates the pistons within the right row of cylinders, and causes the the right rigid connector to move a first distance, the first sensor output corresponding to the first distance;

the second sensing means comprising:

a left row of cylinders equal in number to the pairs of parallel wheels; each cylinder in the left row of cylinders communicating with the output pressure from a pump/motor on the left side; a piston disposed within each cylinder; a left rigid connector means attached between all of the pistons in the left row of cylinders, so that every piston in the left row of cylinders moves along equidistant parallel paths; the output pressure from the pump/motors on the left side actuates the pistons within the left row of cylinders, and causes the the left rigid connector to move a second distance, the second sensor output corresponding to the second distance.

4. The device in claim 3 and further comprising a hydraulic pump for each wheel on the right side; each hydraulic pump having a hydraulic pump feed; the valve means comprises:

a plunger having a first end and a second end;

a piston valve for each hydraulic pump, the piston valves linearly attached to the first end of the plunger;

a chamber for each hydraulic pump;

a right distribution line feed for each hydraulic pump, the right distribution line feeds communicating between the valve means and the pump/motors attached to the wheels on the right side of the vehicle;

a left distribution line feed for each hydraulic pump, the left distribution line feeds communicating between the valve means and the pump/motors attached to the wheels on the left side of the vehicle; each chamber communicating a hydraulic pump feed with a pair of left and right distribution line feeds, each pair of distribution line feeds communicates with the pump/motors attached to a pair of axially aligned wheels;

the piston valves linearly traverse the chambers, one piston valve partially blocking each pair of left and right distribution line feeds, the pair of distribution line feeds are arranged so that forward travel of the piston valves tends to open all right distribution line feeds and close all left distribution line feeds, and rearward travel of the piston valves tends to open all left distribution line feeds and close all right distribution line feeds;

a pinion gear attached between the right and left rigid connectors, so that movement of the right rigid connector is opposite to movement of the left rigid connector and causes the pinion gear to rotate;

a rack gear engaged with the pinion gear, the rack gear is linearly attached to the second end of the plunger; so that rotation of the pinion gear causes the piston valves to travel linearly.

5. A hydromechanical all wheel drive device for a vehicle wherein the vehicle has a right side and a left side, two wheels on each side, each wheel on the left side being parallel with and axially aligned with a corresponding wheel on the right side, the vehicle further having both mechanical and hydraulic drive inputs to each wheel through a planetary gear set; the hydraulic drive input is through an outer annulus in the planetary gear set and the mechanical drive input is through a sun gear in the planetary gear set; the hydraulic drive inputs including a hydraulic pump/motor attached to each wheel, the pump/motors having an input pressure and an output pressure; the output pressure corresponding to the rotational speed of the wheel; a first total of the rotational speeds of the wheels on the right side; a second total of the rotational speeds of the wheels on the left side; the wheel traction sensor comprising:

two right cylinders, each right cylinder communicating with the output pressure from a pump/motor on the right side;

two left cylinders; each left cylinder communicating with the output pressure from a pump/motor on the left side;

a piston within each cylinder;

a right rigid connector means attached between both pistons in the right cylinders, so that both pistons in the right cylinders move along equidistant parallel paths;

a left rigid connector means attached between both pistons in the left cylinders, so that both pistons in the left cylinders move along equidistant parallel paths;

a pinion gear attached between the right and left rigid connectors, so that movement of the right rigid connector is opposite to movement of the left rigid connector and causes the pinion gear to rotate;

a valve means connected to the pinion gear and to the input pressure of each pump/motor, the valve means comprising;

a plunger having a first end and a second end;

two hydraulic pumps, each hydraulic pump having a hydraulic pump feed;

two piston valves, the piston valves linearly attached to the first end of the plunger;

two chambers;

two right distribution line feeds, the right distribution line feeds communicating between the valve means and the pump/motors attached to the wheels on the right side of the vehicle;

two left distribution line feeds the left distribution line feeds communicating between the valve means and the pump/motors attached to the wheels on the left side of the vehicle;

each chamber communicating a hydraulic pump feed with a pair of left and right distribution line feeds, each pair of distribution line feeds communicating with the pump/motor attached to a pair of axially aligned wheels;

the piston valves linearly traverse the chambers, with one piston valve partially blocking each pair of distribution line feeds, the pair of distribution line feeds are arranged so that forward travel of the piston valves tends to open all right distribution line feeds and close all left distribution line feeds, and rearward travel of the piston valves tends to open all left distribution line feeds and close all right distribution line feeds;

a rack gear engaged with the pinion gear, the rack gear is linearly attached to the second end of the plunger, so that rotation of the pinion gear caused the piston valves to travel linearly;

the valve means senses a difference between the output pressures from the pump/motors attached to the wheels on the right side and the pump/motors attached to the wheels on the left side, the difference corresponding to the difference between the first total and second total, the valve means increases the input pressure to pump/motors on the side of the vehicle with the slower turning wheels, and decreases the input pressure to the pump/motors on the side of the vehicle with the faster turning wheels.

* * * * *